No. 782,418. PATENTED FEB. 14, 1905.
J. ROGERS.
NUT LOCK.
APPLICATION FILED JULY 8, 1904.
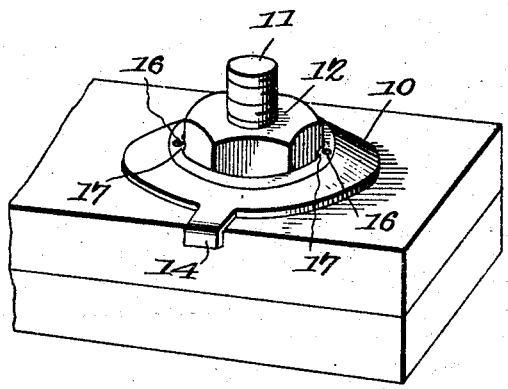
Fig. 1.
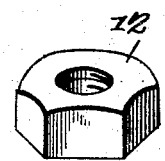
Fig. 3.
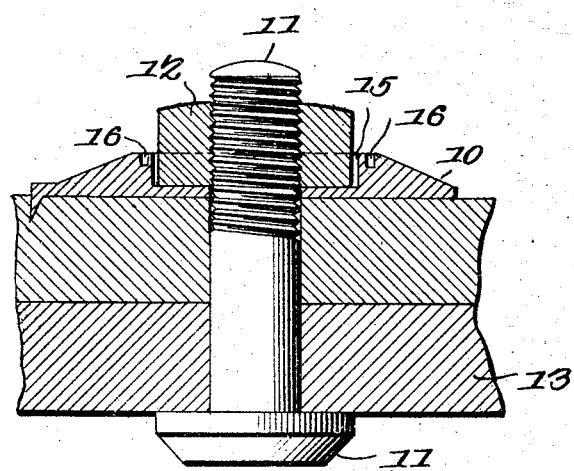
Fig. 2.
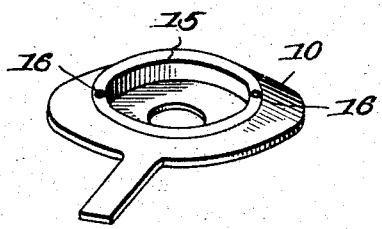
Witnesses
E. H. Stewart
C. N. Woodward
John Rogers, Inventor.
by Cashrow & Co
Attorneys No. 782,418. Patented February 14, 1905.

UNITED STATES PATENT OFFICE.

JOHN ROGERS, OF GRAYMONT, ILLINOIS.

NUT-LOCK.

SPECIFICATION forming part of Letters Patent No. 782,418, dated February 14, 1905.

Application filed July 8, 1904. Serial No. 215,769.

*To all whom it may concern:*

Be it known that I, JOHN ROGERS, a citizen of the United States, residing at Graymont, in the county of Livingston and State of Illinois, have invented a new and useful Nut-Lock, of which the following is a specification.

This invention relates to nut-locks, and has for its object to provide a simply-constructed device of this class whereby the nut will be effectually held from rotation rearwardly on the bolt and readily applicable to any form or size of nut and bolt without change in the structure of either.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device applied. Fig. 2 is a vertical sectional view of the same, and Fig. 3 is a perspective view of the nut and washer detached.

The improved device is embraced in a novel form of washer 10 for position upon the bolt 11 between the nut 12 and the structure to be secured, as indicated at 13, the washer having means, such as one or more projections 14, for bending over the edge of the structure if the latter is of metal or for projecting into the structure in the form of a spur if the structure is of wood. The washer is also provided on its upper face with an annular rim 15, whereby a circular recess is formed to rotatively receive the nut 12, the rim being just large enough to permit the nut to freely rotate therein. Formed in the outer face of the rim 15 are one or more depressions 16, into which an implement of proper form may be forced after the nut is turned "home" to project a portion of the material of the washer into the path of the nut, as at 17, and thus effectually prevent backward movement of the same. The washer, it is obvious, may be formed to fit any size or form of nut and attachable to any form or size of structure, the only change required being to increase or decrease the lengths of the projections 14, and in practice the washers may be constructed with the lugs of a length sufficient for use on the widest structures, and then when employed upon narrower structures the surplus material can be easily cut off, if required.

It will thus be obvious that a very simply-constructed and efficient locking means is provided for the nut without change or mutilation of the nut or the bolt and can be very readily applied to any size or form of nut or bolt. The nut can be quickly released by a few blows upon a cold-chisel to sever the projections 17 or return them to their former position relative to the washer.

Having thus described my invention, what I claim is—

As a new article of manufacture, a washer comprising a body portion provided with an annular rim defining a circular socket for the reception of the nut, there being a plurality of depressions formed in said annular rim for projecting a portion of the wall of said socket into the path of movement of the nut, the body of said washer adjacent the annular rim being reinforced and inclined toward the base of the washer and provided with a radial projection adapted to engage the supporting-body to thereby prevent rotation of said washer.

In testimony that I claim the foregoing as my own I have hereto affixed my signature in the presence of two witnesses.

JOHN ROGERS.

Witnesses:
C. C. STUDLEY,
W. R. LITCHFIELD.